(12) United States Patent
Christian et al.

(10) Patent No.: US 11,926,479 B2
(45) Date of Patent: Mar. 12, 2024

(54) ROD BELT FOR AGRICULTURAL MACHINES

(71) Applicant: ARNOLD JÄGER HOLDING GMBH, Hannover (DE)

(72) Inventors: Carson Christian, Grantsburg, WI (US); Jessica Reed, Askov, MN (US); Jason Cackley, South Bend, IN (US); Scott Koppen, Wanatah, IN (US); Leon Bogucki, Rolling Prairie, IN (US)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 0 days.

(21) Appl. No.: 17/847,325

(22) Filed: Jun. 23, 2022

(65) Prior Publication Data

US 2023/0416005 A1    Dec. 28, 2023

(51) Int. Cl.
| | |
|---|---|
| *B65G 15/52* | (2006.01) |
| *B65G 15/50* | (2006.01) |
| *B65G 15/56* | (2006.01) |
| *B65G 17/42* | (2006.01) |

(52) U.S. Cl.
CPC ............. *B65G 15/56* (2013.01); *B65G 15/50* (2013.01); *B65G 2201/0202* (2013.01)

(58) Field of Classification Search
CPC ........ B65G 15/50; B65G 15/52; B65G 15/56; B65G 17/42
USPC ...................................................... 198/844.1
See application file for complete search history.

(56) References Cited

U.S. PATENT DOCUMENTS

| | | | |
|---|---|---|---|
| 4,653,632 A | 3/1987 | Timmer | |
| 5,099,548 A * | 3/1992 | Loosli | F16G 3/02 198/844.2 |
| 7,182,202 B2 * | 2/2007 | Kalverkamp | B65G 17/02 198/848 |
| 9,033,138 B2 * | 5/2015 | Mulder | B65G 15/52 198/848 |
| 9,033,139 B2 * | 5/2015 | Jager | B65G 15/52 198/850 |
| 9,656,809 B1 * | 5/2017 | Bradshaw | B65G 15/52 |
| 10,183,807 B2 * | 1/2019 | Jäger | B65G 15/44 |
| 10,414,592 B2 * | 9/2019 | Van Wolde | B65G 15/52 |
| 10,533,630 B2 * | 1/2020 | Borgmann | F16G 3/10 |
| 10,850,924 B1 * | 12/2020 | Jäger | B65G 17/42 |

(Continued)

FOREIGN PATENT DOCUMENTS

| | | |
|---|---|---|
| DE | 19520927 A1 | 12/1996 |
| DE | 20011436 U1 | 10/2000 |
| EP | 2813135 A1 | 12/2014 |

*Primary Examiner* — Douglas A Hess
(74) *Attorney, Agent, or Firm* — Barnes & Thornburg LLP (57) ABSTRACT

A rod belt, in particular for rod belt conveyors of agricultural machines, the rod belt having a running direction and comprising: tensile stress-resistant, elastic and continuous belts running in parallel to one another; transverse rods arranged perpendicular to the running direction and parallel to one another in a pre-determined rod spacing, each transverse rod having mounting sections with which the transverse rods rests on the belts, wherein the transverse rods are fastened to the belts by attachment means, passing through the mounting sections of the transverse rods and the belts; and protective forge covers attached to the belts, each forge cover having a mounting profile and a flexible protection profile.

19 Claims, 7 Drawing Sheets

(56) References Cited

U.S. PATENT DOCUMENTS 11,167,315 B2 * 11/2021 Schroeder .............. B65G 15/52
2014/0367230 A1 12/2014 Jäger

* cited by examiner

ROD BELT FOR AGRICULTURAL MACHINES

BACKGROUND

The present disclosure relates to a rod belt for agricultural machines.

SUMMARY

According to the present disclosure, a rod belt for a rod belt conveyor of an agricultural machine is developed in that multiplicity of protective forge covers attached to the belts are provided, each forge cover having a mounting profile and a flexible protection profile, wherein the mounting profile of the forge cover is sandwiched and clamped between one of the mounting sections of the transverse rods and one of the belts, fastening the forge cover together with one of the transverse rods to the respective belt, and wherein the protection profile of the forge cover is projecting upwards from the mounting profile of the forge cover to (at least) laterally enclose or (at least) laterally cover at least one of the mounting sections of the transverse rods by this protection profile. Preferably, a forge cover is provided for each mounting section of each transverse rod of the rod belt, wherein each forge cover is attached to the respective belt in this way.

As a result, the agricultural crop conveyed on a conveying surface of this rod belt is effectively protected against damage, normally caused by collisions with the rather rigid mounting sections. The flexibility of the protection profile of the forge cover allows to prevent the agricultural crop from getting into contact with the mounting sections, in particular with the protruding rivet ends (with rivets as attachment means) or screw end/nut (with screw/nut as attachment means) and the sharp edges of the flattened mounting sections of the transverse rods, as well as to absorb forces.

As the forge covers are directly mounted to the respective belts by clamping between the respective belt and the mounting section, the assembly, disassembly and repair process is simplified as no additional adapters or intermediate parts are necessary. Rather, the preferably one-piece manufactured forge cover can be directly integrated into the assembly process. Further, the forge covers as only additional parts are easy to handle, lightweight and space-savingly applicable as they are just for covering or enclosing the mounting sections of the transverse rod. Consequently, the conveying surface of the rod belt is not significantly affected, additionally favored by the fact that the protection profile is made of a flexible material.

The design of the forge cover or the flexible protection profile can be adapted to the application of the rod belt. In certain embodiments, the protection profile of the respective forge cover is open to the top in order to provide an access opening (which is defined by the protection profiles of one forge cover alone or by the protection profiles of two adjacent forge covers) above the respective mounting section or the attachment means, having a certain access width. This access opening allows to access the mounting sections of the transverse rods or the attachment means for fastening the transverse rods to the belts, e.g., for easier assembly or disassembly or repair of the rod belt.

In certain embodiments the protection profile of the forge cover is designed as at least one, preferably two, flexible shoulders projecting upwards from the mounting profile of the forge cover and inclined and/or curved towards one of the mounting sections of the transverse rods. Preferably, the flexible shoulders are inclined and/or curved in such a way that, in case of being touched by agricultural crop, the flexible shoulders are folded towards the respective mounting section covering it at least in part. This allows to access the mounting sections or the attachment means, e.g., for assembly or disassembly or repair of the rod belt, and simultaneously to cover the mounting sections of the transverse rods during operation of the rod belt. This is further optimized if the two flexible shoulders enclose or cover at least one of the mounting sections of the transverse rods laterally, leaving an exposure as an access gap above the respective mounting section in between the two flexible shoulders, e.g., in case the two flexible shoulders are not touching each other, at least in its unfolded or unloaded state.

In another embodiment, the protection profile of the forge cover is designed as a flexible envelope, preferably formed as a semicircle or formed substantially or essentially semicircular, wherein a first end side of the flexible envelope is attached to the mounting profile of the forge cover and a second end side of the flexible envelope is a free end, such that the semicircular flexible envelope encloses the respective mounting section of the transverse rod laterally and also from the top. This also allows an effective and easy way to protect the agricultural crop from colliding with the mounting sections of the transverse rod, wherein the mounting sections or attachment means can be accessed, e.g., for assembly, disassembly or repair, by pushing up the free second end side in order to fold the flexible envelope about the first end side fixed to the mounting profile. In an alternative embodiment, the semicircular flexible envelope can be attached to the mounting profile of the forge cover on both end sides, wherein at least one additional access hole is inserted into the flexible envelope above the mounting section or the attachment means, in order to provide access to the respective mounting section or attachment means, e.g., for assembly, disassembly or repair.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
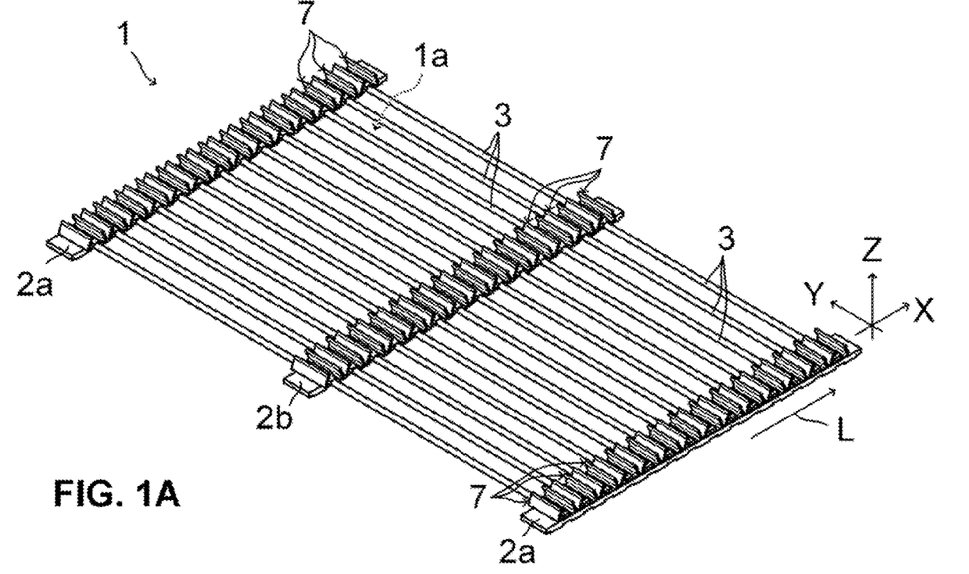
FIG. 1A is a perspective view of a rod belt according to a first embodiment of the present disclosure.

A rod belt 1 for a rod belt conveyor of agricultural machines shown in a perspective view in FIG. 1A comprises three belts 2a, 2b, two outer belts 2a and one inner or center belt 2b, utilized as a traction means for the rod belt 1. The belts 2a, 2b each are circulating on at least one pulley and a drive roller (not shown) in order to drive the belts 2a, 2b. To that end, the belts 2a, 2b each are joined at its end regions so as to form a continuous belt 2a, 2b which can be mounted on the pulley and the roller. Hereby, the endless belts 2a, 2b can be designed as cam belts (as shown having cams or other elevations at the underside) or flat belts (not shown) and the pulleys and rollers correspondingly can be toothed or flat. Thus, the transmission of movement can happen by way of positive locking, which is preferred, or by way of frictional connection.

Each belt 2a, 2b is made of a fabric reinforced polymer, so the fabric layer is covered at least in certain regions from above and below by the polymer layer as polymer surface material, attaining a tensile stress-resistant or tension-proof, elastic belt 2a, 2b. Possibly, other or additional layers and/or polymer coatings may be provided as polymer surface material.

Figure 1B:
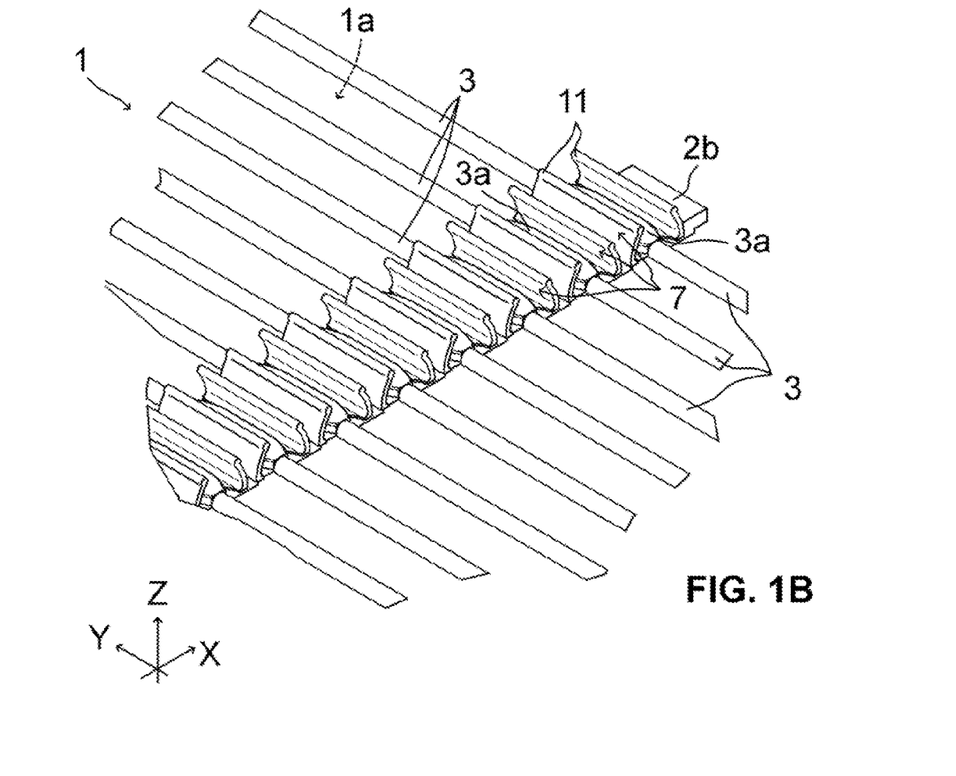
FIGS. 1B, 1C, 1D are detailed views of the rod belt according to FIG. 1A.
Figure 1C:
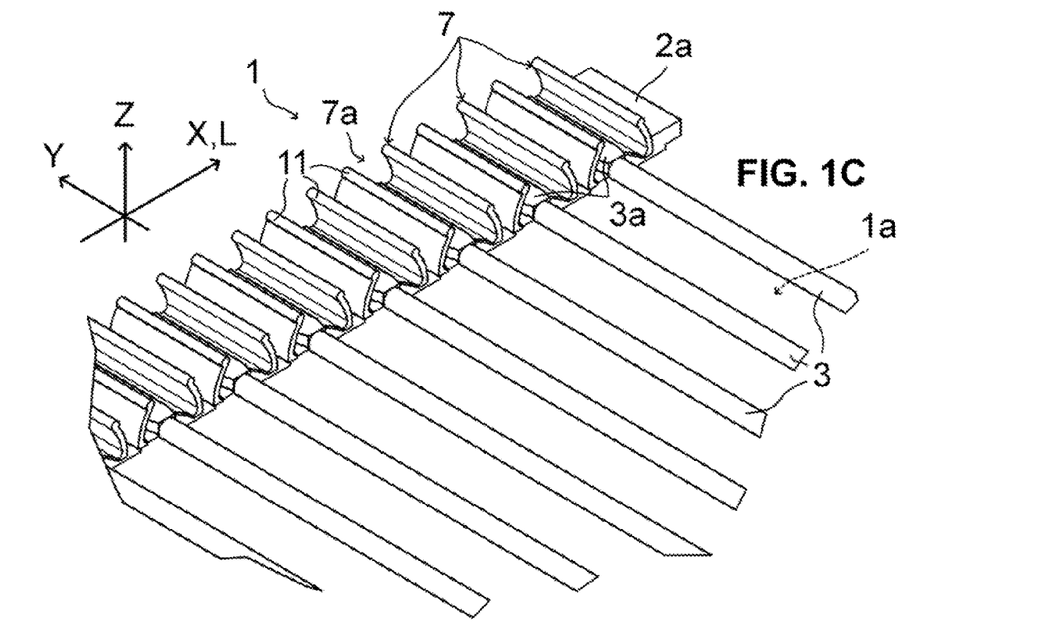
Figure 1D:
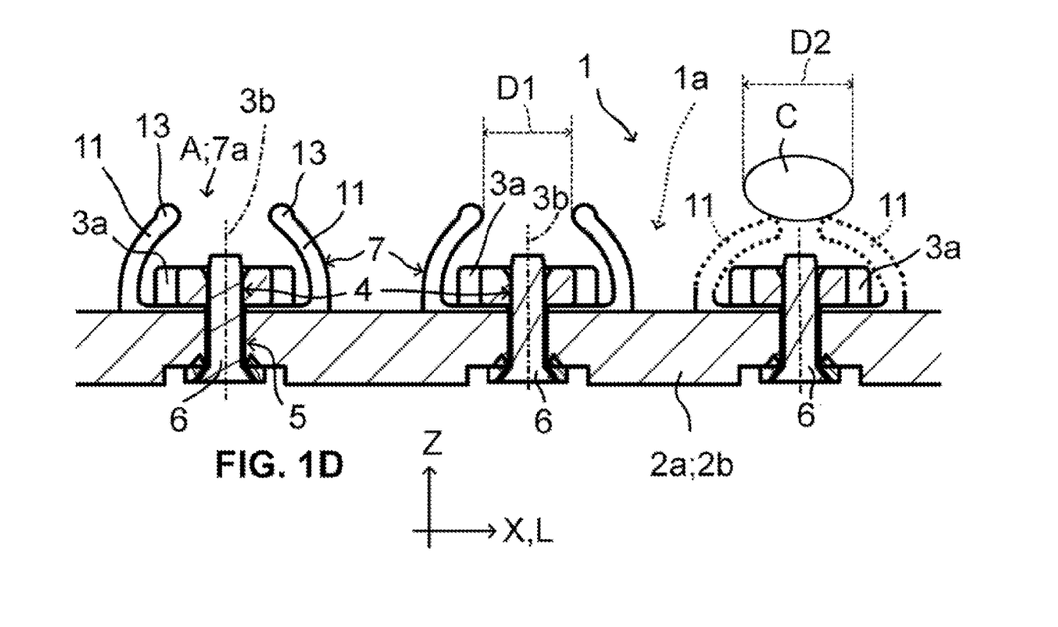

According to FIG. 1A, the belts 2a, 2b are connected to one another by means of a multiplicity of transverse rods 3 arranged transverse (along a transverse axis Y) to a running direction L (along a longitudinal axis X) of the rod belt 1 or the belts 2a, 2b and parallel to one another in a predetermined rod spacing. As shown in detail in FIGS. 1B, 1C and 1D, each of the transverse rods 3 are provided with mounting sections 3a (in the outer and in the center region) which are used to fasten the transverse rods 3 to the (outer and centered) belts 2a, 2b. In the shown embodiment, the mounting sections 3a are formed as flattened mounting sections 3a, containing through holes 4 (s. FIG. 1D) separated at a distance from one another. The flattened mounting sections 3a are placed on the belts 2a, 2b, also having through holes 5, wherein the distance between these through holes 5 corresponds to the distance between the through holes 4 in the flattened mounting sections 3a.

After mutually aligning the through holes 4, 5, attachment means 6, e.g., rivets, bolts, screws, or the like are inserted through the aligned through holes 4, 5 in order to fasten the transverse rods 3 to the respective belts 2a, 2b. A rod belt 1 assembled in this manner can then be used to convey agricultural crop C, e.g., potatoes, maize, sugar cane, or the like, located on a conveying surface 1a formed by the multiplicity of transverse rods 3 along the running direction L. In order to secure the conveyed agricultural crop C from damage from collisions with the mounting sections 3a, additional forge covers 7 are provided within the rod belt 1.

Such forge covers 7 can be provided in different embodiments, as described hereinafter, wherein each forge cover 7 consists of a mounting profile 8 and a protection profile 9, which are made of one piece, e.g., by extrusion, in particular multi-durometer extrusion of thermoplastic elastomers (TPE) or injection molding or transfer molding or compression molding. The mounting profile 8 is manufactured rigid and serves for fastening the forge cover 7 to the respective belt 2a, 2b. The protection profile 9 is elastic or flexible and serves to cover the mounting sections 3a, preventing the conveyed agricultural crop C to directly collide with the rigid mounting sections 3a, e.g., the sharp edges of the flattened mounting sections 3a, as well as the attachment means 6, e.g., the rivet ends if rivets are used or screw ends/nuts if screws/nuts are used.

In certain embodiments, the protection profile 9 of the respective forge cover 7 is open to the top in order to provide an access opening A above the respective mounting section 3a or the attachment means 6, having a certain access width D1, wherein, depending on the embodiment, the access opening A is defined by the protection profile 9 of one forge cover 7 alone or by the protection profiles 9 of two adjacent forge covers 7, as described hereinafter. The access opening A allows to access the mounting sections 3a or the attachment means 6, e.g., for assembly or disassembly or repair of the rod belt 1. For optimal protection of the agricultural crop C the access width D1 is chosen to be smaller than a crop width D2 (along its large half axis) of the conveyed agricultural crop C.

Figure 2A:
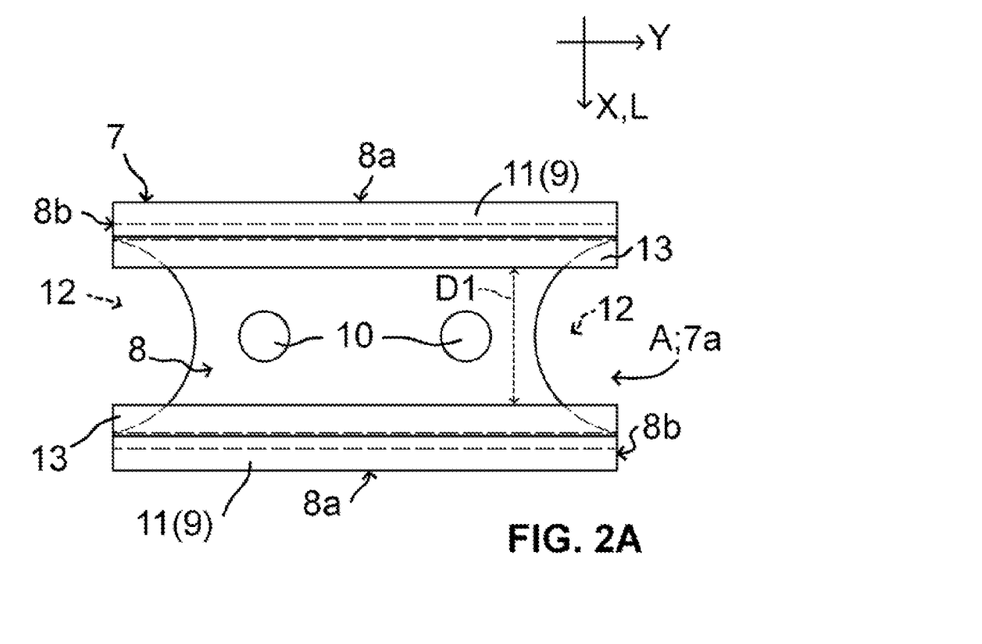
FIGS. 2A and 2B are detailed views of forge covers of the rod belt according to FIGS. 1A, 1B, 1C, 1D.
Figure 2B:
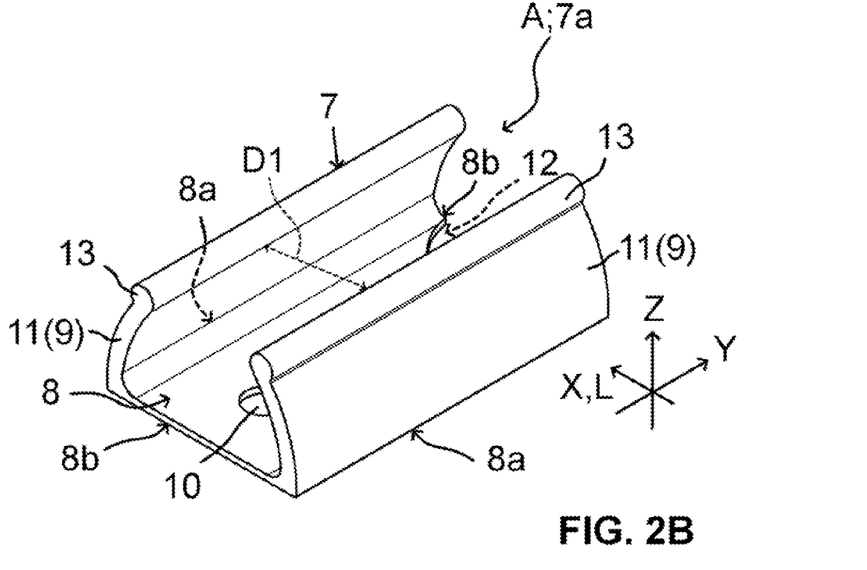

According to a first embodiment, shown in detail in FIGS. 2A, 2B, through holes 10 are provided in the mounting profile 8 of each forge cover 7, wherein the distance between these through holes 10 corresponds to the distance between the through holes 4 in the mounting sections 3a of the respective transverse rods 3 and the distance between the through holes 5 in the respective belts 2a, 2b. Consequently, the attachment means 6 can be used to fasten the transverse rod 3 as well as the forge cover 7 to the respective belt 2a, 2b after mutually aligning the through holes 4, 5, 10. Hereby, the mounting profile 8 is sandwiched between the mounting section 3a of the respective transverse rod 3 and the respective belt 2a, 2b, providing a planar fastening.

Further, additional cutouts 12 are provided at one (outer belts 2a) or both (center belt 2b) longitudinal sides 8b (sides of the mounting profile 8 extending substantially or essentially along the longitudinal axis X of the rod belt 1) such that the cutouts 12 are facing towards the respective transverse rod 3. The cutouts 12 might be circular (as shown) or rectangular (not shown). These cutouts 12 simplify the assembly process of the rod belt 1, in particular the transverse rods 3.

In the first embodiment, the forge covers 7 protection profile 9 is divided into two parts, wherein it is designed as two flexible shoulders 11 projecting upwards (along a vertical axis Z) on opposite transverse sides 8a (sides of the mounting profile 8 extending substantially or essentially along the transverse axis Y of the rod belt 1). Simultaneously, each flexible shoulder 11 is (inwardly) inclined and curved towards a center plane 3b symmetrically intersecting one of the mounting sections 3a of a transverse rod 3, as shown in FIG. 1D. Consequently, in the assembled state of the rod belt 1, the respective mounting section 3a is laterally (along the longitudinal axis X) enclosed by the flexible shoulders 11 belonging to the same forge cover 7 and is exposed towards the top.

As soon as agricultural crop C moving towards a mounting section 3a of the transverse rod 3 touches the flexible shoulders 11 during operation of the rod belt 1, the flexible shoulders 11 belonging to the same forge cover 7 each are folded towards the same center plane 3b (or towards each other), as indicated by the dotted line in FIG. 1D. This effectively prevents the agricultural crop C from directly touching the rigid mounting section 3a of the transverse rod 3, in particular its sharp edges. Once the agricultural crop C is not in contact with the flexible shoulders 11 anymore, they fold back in its original state due to the elasticity of the material. Thus, every time the rod belt 1 is not in operation, the mounting sections 3a or the attachment means 6 are accessible from the top through the exposure 7a between the unfolded shoulders 11, allowing an assembly or disassembly or repair of the rod belt 1. Thereby, the access width D1 of the exposure 7a as an access opening A according to this embodiment, is defined as the width between the distal ends of the flexible shoulders 11, wherein this width is chosen to be smaller than the crop width D2 (along its large half axis) of the conveyed agricultural crop C, in order to prevent agricultural crop C to pass through the exposure 7a.

In order to improve the durability of the forge cover 7, which is subject to permanent stress when frequently folded and unfolded during operation of the rod belt 1, the cross-section or thickness of the flexible shoulders 11 is extended (in comparison to the mounting profile 8). As further shown, the flexible shoulders 11 each comprises rounded end extensions 13 in order to improve durability of the forge cover 7 and protection of the agricultural crop C.

According to a second embodiment, shown in detail in FIGS. 3A, 3B, 3C, again through holes 10 are provided in the mounting profile 8 of each forge cover 7, wherein the distance between these through holes 10 corresponds to the distance between the through holes 4 in the mounting sections 3a of the respective transverse rods 3 and the distance between the through holes 5 in the respective belts 2a, 2b. Consequently, the attachment means 6 can be used to fasten the transverse rod 3 as well as the forge cover 7 to the respective belt 2a, 2b after mutually aligning the through holes 4, 5, 10. Hereby, the mounting profile 8 is sandwiched between the mounting section 3a of the respective transverse rod 3 and the respective belt 2a, 2b, providing a planar fastening. Although, additional cutouts 12 are not shown for the second embodiment of the present disclosure, they can be provided in the same manner as in the first embodiment, e.g., at one or both longitudinal sides 8b besides the through holes 10 in the mounting profile 8.

Figures 3A, 3B:
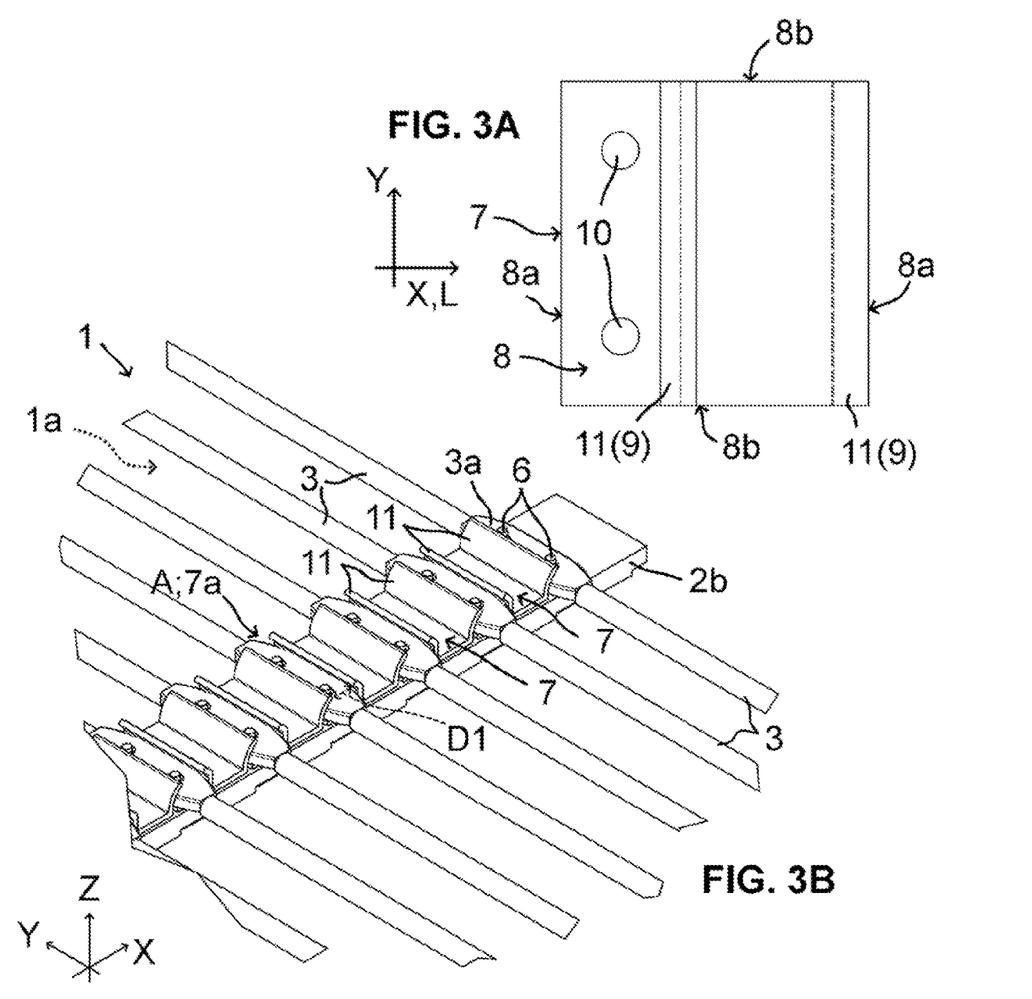
FIGS. 3A, 3B, 3C are detailed views of a rod belt according to a second embodiment of the present disclosure.
Figure 3C:
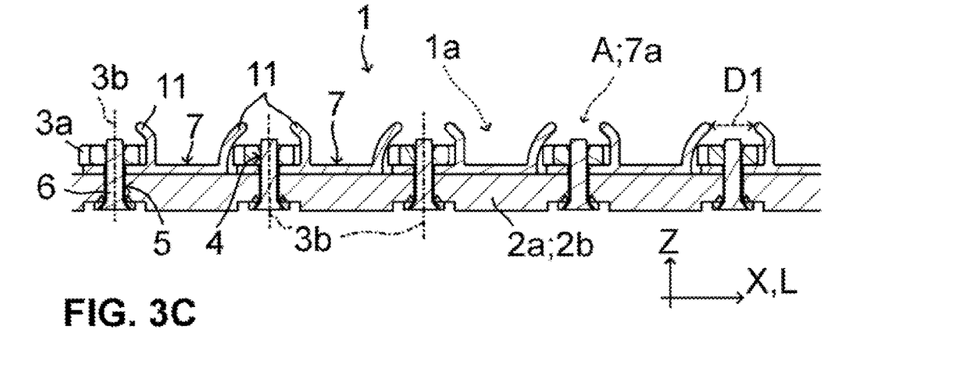

As in the first embodiment, the forge covers 7 protection profile 9 is divided into two parts, wherein it is designed as two flexible shoulders 11 projecting upwards (along a vertical axis Z) from the mounting profile 8 of the respective forge cover 7. However, according to the second embodiment, each flexible shoulder 11 belonging to the same forge cover 7 is inclined and curved towards another center plane 3b, each center plane 3b symmetrically intersecting another mounting section 3a, as shown in FIG. 3C. In other words, each flexible shoulder 11 of the same forge cover 7 is associated to another center plane 3b, thus, covering another mounting section 3a. Consequently, in the assembled state of the rod belt 1, two adjacent forge covers 7 are needed in order to laterally enclose a mounting section 3a from both sides.

In this second embodiment, as soon as agricultural crop C moving towards a mounting section 3a of a transverse rod 3 touches the flexible shoulders 11 during operation of the rod belt 1, the flexible shoulders 11 belonging to the same forge cover 7 each are folded opposite to each other towards different center planes 3b. Or in other words, the flexible shoulders 11 belonging to different and adjacent forge covers 7 and associated to the same mounting section 3a are folded towards the same center plane 3b (or towards each other). This effectively prevents the agricultural crop C from directly touching the rigid mounting section 3a of the transverse rod 3, in particular its sharp edges. Once the agricultural crop C is not in contact with the flexible shoulders 11 anymore, they fold back in its original state due to the elasticity of the material. Thus, every time the rod belt 1 is not in operation, the mounting sections 3a or the attachment means 6 are accessible from the top through the exposure 7a between the unfolded shoulders 11, allowing an assembly or disassembly or repair of the rod belt 1. Thereby, the access width D1 of the exposure 7a as an access opening A according to this embodiment, is again defined as the width between the distal ends of the flexible shoulders 11, wherein this width is chosen to be smaller than the crop width D2 (along its large half axis) of the conveyed agricultural crop C, in order to prevent agricultural crop C to pass through the exposure 7a.

According to the FIGS. 3A, 3B, 3C the two flexible shoulders 11 belonging to the same forge cover 7 have a slightly different inclined and curved shape, which is just for the purpose of simplifying the manufacturing process and/or for design purposes. However, both flexible shoulders 11 can be designed identical in order to laterally enclose the respective mounting section 3a in a symmetrical way, e.g., as shown in the first embodiment. Also rounded end extensions 13 can be provided to the flexible shoulders 11 of the second embodiment (not shown) in order to improve durability of the forge cover 7 and better protection of the agricultural crop C. Further, the cross-section or thickness of the flexible shoulders 11 can be extended (in comparison to the mounting profile 8) also in the second embodiment.

According to a third embodiment, shown in detail in FIGS. 4A, 4B, 4C, again through holes 10 are provided in the mounting profile 8 of each forge cover 7, wherein the distance between these through holes 10 corresponds to the distance between the through holes 4 in the mounting sections 3a of the respective transverse rods 3 and the distance between the through holes 5 in the respective belts 2a, 2b. Consequently, the attachment means 6 can be used to fasten the transverse rod 3 as well as the forge cover 7 to the respective belt 2a, 2b after mutually aligning the through holes 4, 5, 10. Hereby, the mounting profile 8 is sandwiched between the mounting section 3a of the respective transverse rod 3 and the respective belt 2a, 2b, providing a planar fastening. Although, additional cutouts 12 are not shown for the third embodiment of the present disclosure, they can be provided in the same manner as in the first embodiment, e.g., at one or both longitudinal sides 8b in the area of the mounting profile 8 the through holes 10 are formed.

Figures 4A, 4B:
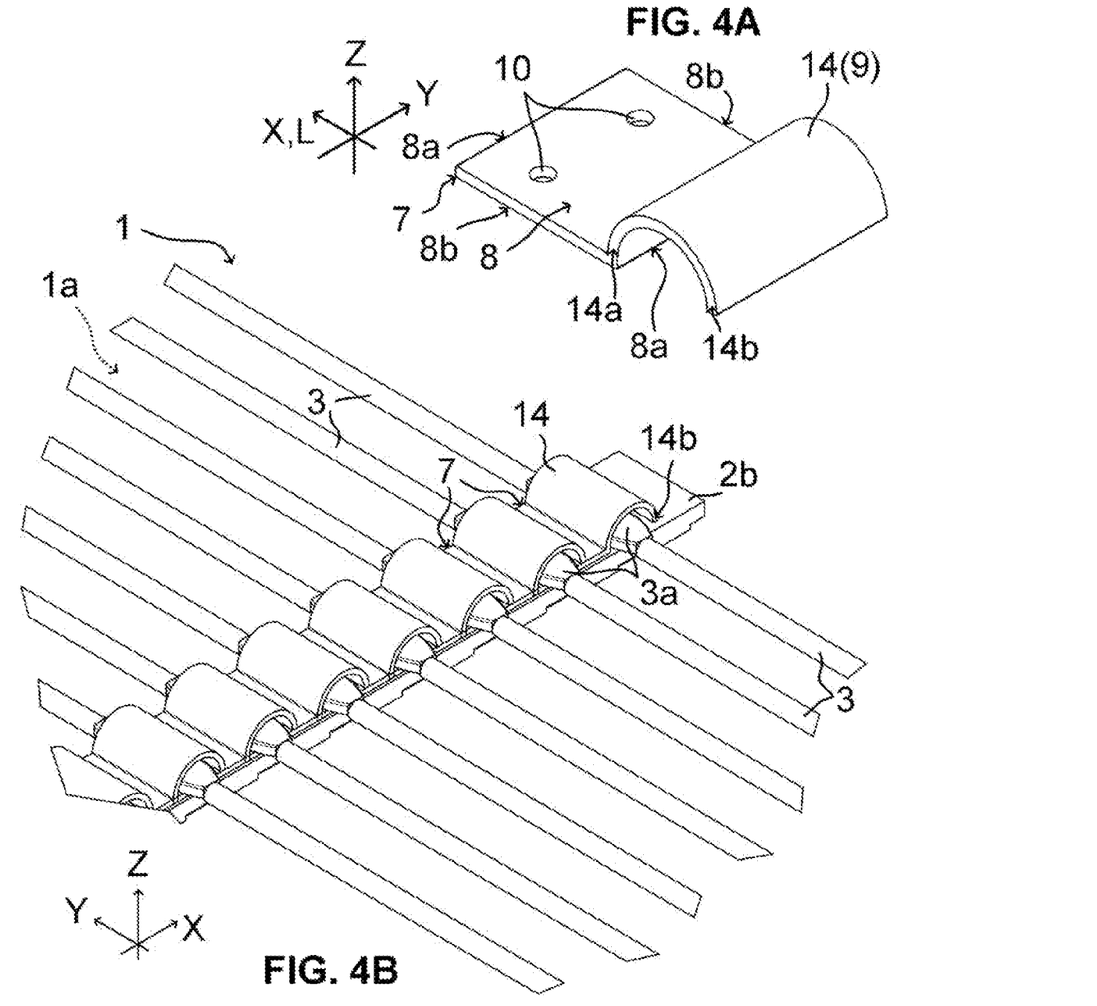
FIGS. 4A, 4B, 4C are detailed views of a rod belt according to a third embodiment of the present disclosure.
Figure 4C:
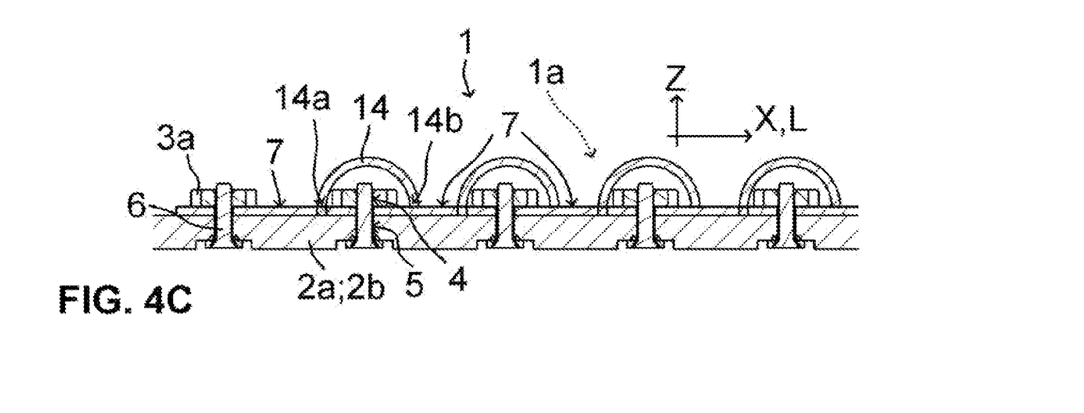

In the third embodiment the forge covers 7 protection profile 9 comprises just one part, wherein it is designed as a flexible envelope 14. A first end side 14a of the flexible envelope 14 is attached to one of the transverse sides 8a of the mounting profile 8 and a second end side 14b of the flexible envelope 14 is a free end. As shown in FIG. 4C, the flexible envelope 14 is formed as a semicircle or formed substantially or essentially semicircular between both end sides 14a, 14b such that in the assembled state of the rod belt 1 the substantially or essentially semicircular flexible envelope 14 encloses the respective mounting section 3a of the transverse rod 3 laterally (transverse axis Y) and also from the top (vertical axis Z).

Moreover, the mounting profile 8 and the protection profile 9 of a certain forge cover 7 are associated to different mounting sections 3a or different transverse rods 3 in the assembled state of the rod belt 1, meaning that a mounting profile 8 belonging to a certain forge cover 7 is fixated to the respective belt 2a, 2b by a mounting section 3a that is enclosed by a protection profile 9 (flexible envelope 14) belonging to an adjacent forge cover 7.

In this third embodiment, agricultural crop C moving towards a mounting section 3a of a transverse rod 3 during operation of the rod belt 1 is automatically touching and elastically deforming the flexible envelope 14 as it is laterally and vertically enclosing the mounting section 3a. This effectively prevents the agricultural crop C from directly touching the rigid mounting section 3a of the transverse rod 3 and causing damage to it. In order to access the mounting section 3a or the attachment means 6 from the top, e.g., for assembly, disassembly or repair, the flexible envelope 14 can be folded about the first end side 14a fixed to the mounting profile 8 by pushing up the second end side 14b.

In addition, the cross-section or thickness of the flexible envelope 14 can be extended (in comparison to the mounting profile 8) also in the third embodiment.

According to a fourth embodiment, shown in detail in FIGS. 5A, 5B, 5C again through holes 10 are provided in the mounting profile 8 of each forge cover 7, wherein the distance between these through holes 10 corresponds to the distance between the through holes 4 in the mounting sections 3*a* of the respective transverse rods 3 and the distance between the through holes 5 in the respective belts 2*a*, 2*b*. Consequently, the attachment means 6 can be used to fasten the transverse rod 3 as well as the forge cover 7 to the respective belt 2*a*, 2*b* after mutually aligning the through holes 4, 5, 10. Hereby, the mounting profile 8 is sandwiched between the mounting section 3*a* of the respective transverse rod 3 and the respective belt 2*a*, 2*b*, providing a planar fastening. Although, additional cutouts 12 are not shown for the fourth embodiment of the present disclosure, they can be provided in the same manner as in the first embodiment, e.g., at one or both longitudinal sides 8*b* of the mounting profile 8.

Figure 5A:
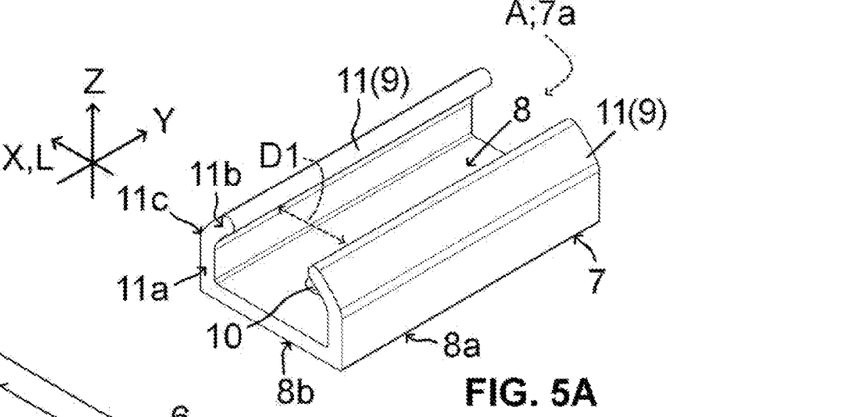
FIGS. 5A, 5B, 5C are detailed views of a rod belt according to a fourth embodiment of the present disclosure.
Figure 5B:
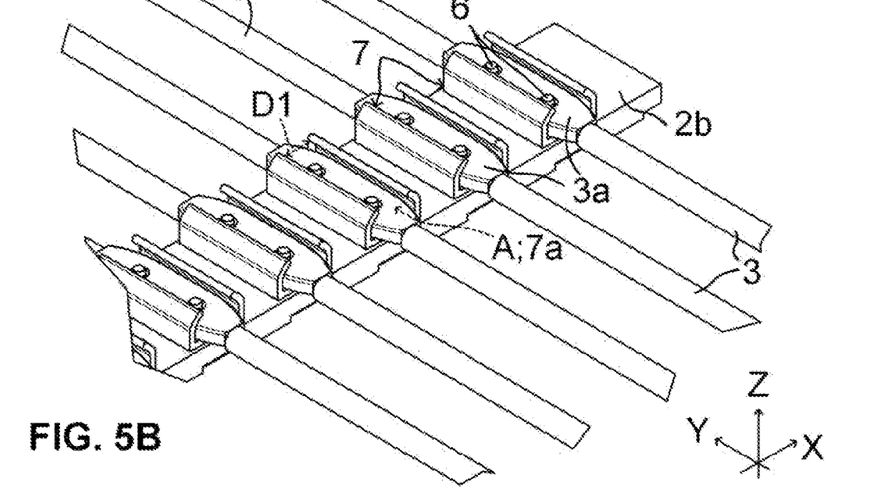
Figure 5C:
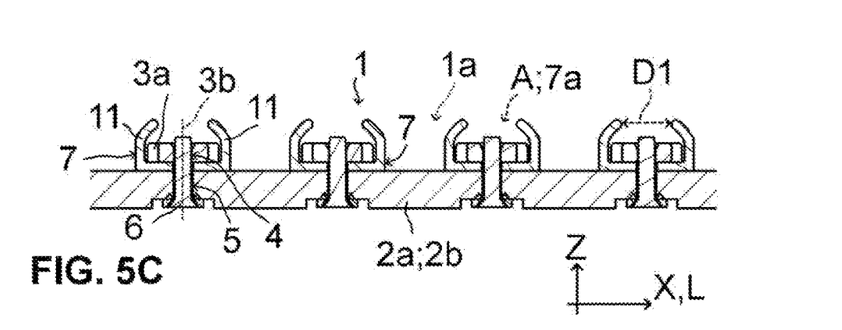

In the fourth embodiment, the forge covers 7 protection profile 9 is again divided into two parts, wherein it is designed as two flexible shoulders 11 projecting upwards on opposite transverse sides 8*a* of the mounting profile 8, comparable to the first embodiment. However, in contrast to the first embodiment each flexible shoulder 11 has a straight section 11*a* attached to the mounting profile 8 passing over into a curved section 11*b* at a kink point 11*c*. Thus, the shape of the flexible shoulders 11 in this fourth embodiment is more edgy or not evenly curved as in the first embodiment.

Although, the shape of the flexible shoulders 11 is slightly different in comparison to the first embodiment, they are also (inwardly) inclined towards a center plane 3*b* symmetrically intersecting one of the mounting sections 3*a* of a transverse rod 3, as shown in FIG. 5C. Consequently, in the assembled state of the rod belt 1, the respective mounting section 3*a* is laterally enclosed by the flexible shoulders 11 belonging to the same forge cover 7 and is exposed towards the top.

As soon as agricultural crop C moving towards a mounting section 3*a* of the transverse rod 3 touches the flexible shoulders 11 during operation of the rod belt 1, the flexible shoulders 11 belonging to the same forge cover 7 each are folded towards the same center plane 3*b* (or towards each other). This effectively prevents the agricultural crop C from directly touching the rigid mounting section 3*a* of the transverse rod 3, in particular its sharp edges. Once the agricultural crop C is not in contact with the flexible shoulders 11 anymore, they fold back in its original state due to the elasticity of the material. Thus, every time the rod belt 1 is not in operation, the mounting sections 3*a* or the attachment means 6 are accessible from the top through the exposure 7*a* between the unfolded shoulders 11 or the curved sections 11*b*, allowing an assembly or disassembly or repair of the rod belt 1. Thereby, the access width D1 of the exposure 7*a* as an access opening A according to this embodiment, is again defined as the width between the distal ends of the flexible shoulders 11, wherein this width is chosen to be smaller than the crop width D2 (along its large half axis) of the conveyed agricultural crop C, in order to prevent agricultural crop C to pass through the exposure 7*a*.

Although not shown for the fourth embodiment of the present disclosure, in order to improve the durability of the forge cover 7, which is subject to permanent stress when frequently folded and unfolded during operation of the rod belt 1, the cross-section or thickness of the flexible shoulders 11 might be extended (in comparison to the mounting profile 8). Further, rounded end extensions 13 (not shown) might be located at the free ends of the curved sections 11*b* in the fourth embodiment (comparable to the first embodiment) in order to improve durability of the forge cover 7 and protection of the agricultural crop C.

Figures 6A, 6B:
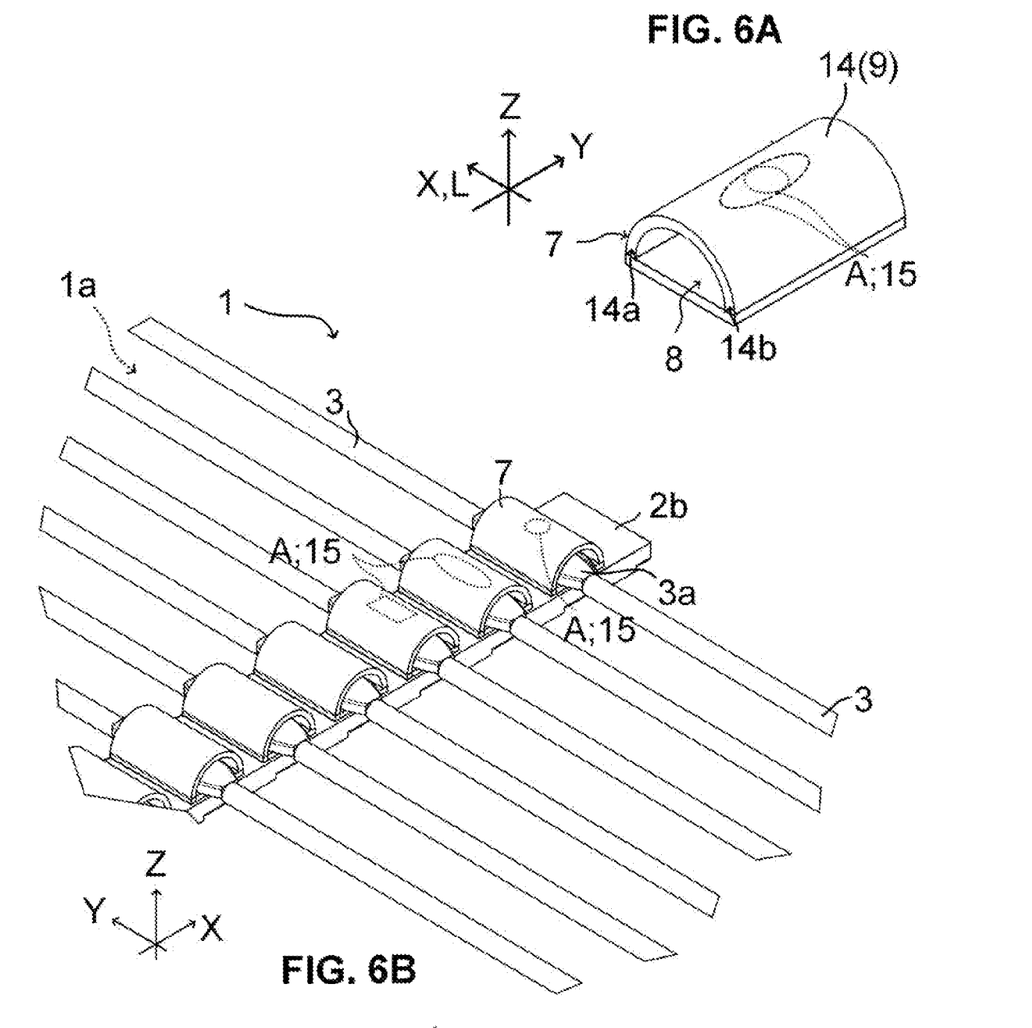
FIG. 6A, 6B, 6C are detailed views of a rod belt according to a fifth embodiment of the present disclosure.
Figure 6C:
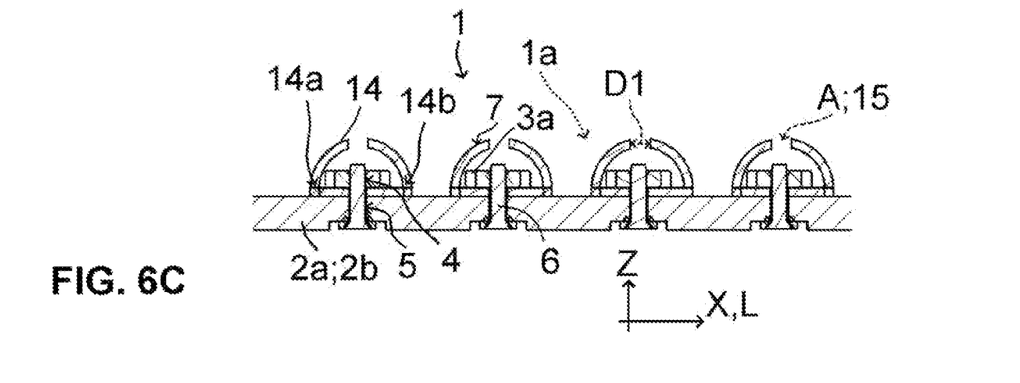

A fifth embodiment, shown in detail in FIGS. 6A, 6B, 6C, is a certain combination of the first and the fourth embodiment, wherein the protection profile 9 is designed as a semicircular flexible envelope 14, having a first end side 14*a* and a second end side 14*b*, both attached to the mounting profile 8 of the forge cover 7. Above the mounting section 3*a* or the attachment means 6 an additional access hole 15 (e.g., circular hole or oblong hole or rectangular hole) is provided in the flexible envelope 14 in order to provide an access opening A in the protection profile 9. Thus, every time the rod belt 1 is not in operation, the mounting sections 3*a* or the attachment means 6 are accessible from the top through the access hole 15, allowing an assembly or disassembly or repair of the rod belt 1 according to this fifth embodiment. Thereby, the access width D1 (along longitudinal axis) of the access hole 15 according to this fifth embodiment is chosen to be smaller than the crop width D2 (along its large half axis) of the conveyed agricultural crop C, in order to prevent agricultural crop C to pass through the access hole 15.

Thus, different embodiments of the forge cover 7 have been described, wherein the skilled in the art would also take into account slight modifications of the shape or construction of the mounting profile 8 and/or the protection profile 9 in order to provide the described technical effect, e.g., the covering of the mounting sections 3*a* and the protection of the conveyed crop C as well as an easy access of the attachment means 6.

Comparative rod belts for rod belt conveyors of agricultural machines are designed as disclosed in e.g., DE 195 20 927 A1. Rod belts of this type comprise two or more tension-proof elastic and continuous belts running parallel to one another and which are connected to one another by means of a multiplicity of transverse rods arranged transverse to the running direction of the rod belt and parallel to one another. For attaching the transverse rods to the belts, the transverse rods are provided with flattened and perforated support regions with which they rest on the belts. The connection of the support regions with the belts is made by means of rivets or similar attachment means which pass through the support regions and the belts.

A further comparative rod belt is described in the citation DE 200 11 436 U1. In this rod belt the end of the transverse rods are connected to the belts not directly, but each via an attachment piece. The attachment pieces are made from an unnotched specimen by means of forging. They comprise a flattened and perforated support region transitioning in a transition region via a cranked section to an attachment region for the ends of the transverse rods. The attachment region is formed by a cylindrical sleeve or a corresponding blind hole extending in the direction of the transverse rods. The rods are made or plastics and are fixated by clamping inside the sleeves. The support regions of the attachment pieces rest on the upper side of the belts and are attached to these by means of rivets.

In the document EP 2 813 135 A1 a further comparative rod belt is described in which the transverse rods are attached to the belt in groups of three via an attachment piece, for example, a bar. To that end, the transverse rods are attached to a bar at their front sides in the group of three. The bar transitions via a curvature into a flattened and perforated support region which rests on the belts. The support region is attached to the belt via attachment means, for example, screws or rivets.

The disadvantage with this kind of attachment means, e.g., rivets or bolts or the like, is that food crop or agricultural crop, e.g., potatoes, sugar beet, maize, etc. gets in contact or collides with the attachment means as well as with the sharp edges of the flattened support region of the transverse rod during the normal conveying operation. Normally, the transported agricultural crop is pressed against the attachment means or the sharp edges by its own weight or by other crops lying on top of it. This causes damage to the agricultural crop.

In order to minimize this kind of damage, U.S. Pat. No. 4,653,632 proposes to attach crop-protective accessories to an attachment member on the transverse rods of the rod belt. The crop-protective accessories cover the sprocket run and the riveted end of the respective transverse rod. The attachment of the crop-protective accessories is accomplished by a u-shaped member that is adapted to mate with a tongue portion of the attachment member.

It is the object of the present disclosure to provide a rod belt which is easy to assemble and to maintain and that allows conveying of agricultural crop without damaging the agricultural crop.

According to the present disclosure, a rod belt for a rod belt conveyor of an agricultural machine is developed in that multiplicity of protective forge covers attached to the belts are provided, each forge cover having a mounting profile and a flexible protection profile, wherein the mounting profile of the forge cover is sandwiched and clamped between one of the mounting sections of the transverse rods and one of the belts, fastening the forge cover together with one of the transverse rods to the respective belt, and wherein the protection profile of the forge cover is projecting upwards from the mounting profile of the forge cover to (at least) laterally enclose or (at least) laterally cover at least one of the mounting sections of the transverse rods by this protection profile. Preferably, a forge cover is provided for each mounting section of each transverse rod of the rod belt, wherein each forge cover is attached to the respective belt in this way.

As a result, the agricultural crop conveyed on a conveying surface of this rod belt is effectively protected against damage, normally caused by collisions with the rather rigid mounting sections. The flexibility of the protection profile of the forge cover allows to prevent the agricultural crop from getting into contact with the mounting sections, in particular with the protruding rivet ends (with rivets as attachment means) or screw end/nut (with screw/nut as attachment means) and the sharp edges of the flattened mounting sections of the transverse rods, as well as to absorb forces.

As the forge covers are directly mounted to the respective belts by clamping between the respective belt and the mounting section, the assembly, disassembly and repair process is simplified as no additional adapters or intermediate parts are necessary. Rather, the preferably one-piece manufactured forge cover can be directly integrated into the assembly process. Further, the forge covers as only additional parts are easy to handle, lightweight and space-savingly applicable as they are just for covering or enclosing the mounting sections of the transverse rod. Consequently, the conveying surface of the rod belt is not significantly affected, additionally favored by the fact that the protection profile is made of a flexible material.

The design of the forge cover or the flexible protection profile can be adapted to the application of the rod belt. In certain embodiments, the protection profile of the respective forge cover is open to the top in order to provide an access opening (which is defined by the protection profiles of one forge cover alone or by the protection profiles of two adjacent forge covers) above the respective mounting section or the attachment means, having a certain access width. This access opening allows to access the mounting sections of the transverse rods or the attachment means for fastening the transverse rods to the belts, e.g., for easier assembly or disassembly or repair of the rod belt.

In certain embodiments the protection profile of the forge cover is designed as at least one, preferably two, flexible shoulders projecting upwards from the mounting profile of the forge cover and inclined and/or curved towards one of the mounting sections of the transverse rods. Preferably, the flexible shoulders are inclined and/or curved in such a way that, in case of being touched by agricultural crop, the flexible shoulders are folded towards the respective mounting section covering it at least in part. This allows to access the mounting sections or the attachment means, e.g., for assembly or disassembly or repair of the rod belt, and simultaneously to cover the mounting sections of the transverse rods during operation of the rod belt. This is further optimized if the two flexible shoulders enclose or cover at least one of the mounting sections of the transverse rods laterally, leaving an exposure as an access gap above the respective mounting section in between the two flexible shoulders, e.g., in case the two flexible shoulders are not touching each other, at least in its unfolded or unloaded state.

In another embodiment, the protection profile of the forge cover is designed as a flexible envelope, preferably formed as a semicircle or formed substantially or essentially semicircular, wherein a first end side of the flexible envelope is attached to the mounting profile of the forge cover and a second end side of the flexible envelope is a free end, such that the semicircular flexible envelope encloses the respective mounting section of the transverse rod laterally and also from the top. This also allows an effective and easy way to protect the agricultural crop from colliding with the mounting sections of the transverse rod, wherein the mounting sections or attachment means can be accessed, e.g., for assembly, disassembly or repair, by pushing up the free second end side in order to fold the flexible envelope about the first end side fixed to the mounting profile. In an alternative embodiment, the semicircular flexible envelope can be attached to the mounting profile of the forge cover on both end sides, wherein at least one additional access hole is inserted into the flexible envelope above the mounting section or the attachment means, in order to provide access to the respective mounting section or attachment means, e.g., for assembly, disassembly or repair.

The present disclosure relates to a rod belt, in particular for rod belt conveyors of agricultural machines, the rod belt having a running direction and comprising:
tensile stress-resistant, elastic and continuous belts running in parallel to one another;
transverse rods arranged perpendicular to the running direction and parallel to one another in a pre-determined rod spacing, each transverse rod having mounting sections with which the transverse rods rests on the belts,
wherein the transverse rods are fastened to the belts by attachment means, passing through the mounting sections of the transverse rods and the belts; and protective forge covers attached to the belts, each forge cover having a mounting profile and a flexible protection profile, wherein the mounting profile of the forge cover is sandwiched and clamped between one of the mounting sections of the transverse rods and one of the belts, fastening the forge cover together with one of the transverse rods to the respective belt, and wherein the protection profile of the forge cover is projecting upwards from the mounting profile of the forge cover to laterally enclose or laterally cover at least one of the mounting sections of the transverse rods by the protection profile.

LIST OF REFERENCE NUMERALS 1 rod belt
1a conveying surface
2a outer belt
2b center belt
3 transverse rod
3a mounting section
3b center plane
4 through holes in the mounting section 3a
5 through holes in the belt 2
6 attachment means
7 forge cover
7a exposure
8 mounting profile
8a transverse side of the mounting profile 8
8b longitudinal side of the mounting profile 8
9 protection profile
10 through hole
11 flexible shoulder
11a straight section
11b curved section
11c kink point
12 cutout
13 end extension
14 flexible envelope
14a first end side of the flexible envelope 14
14b second end side of the flexible envelope 14
15 access hole
A access opening
C agricultural crop
D1 access width
D2 crop width of the agricultural crop C
L running direction
X longitudinal axis
Y transverse axis
Z vertical axis The following numbered clauses include embodiments that are contemplated and non-limiting:

Clause 1. A rod belt for rod belt conveyors of agricultural machines, the rod belt having a running direction and comprising: tensile stress-resistant, elastic and continuous belts running in parallel to one another.

Clause 2. The rod belt of clause 1, any other suitable clause, or any combination of suitable clauses, further comprising transverse rods arranged perpendicular to the running direction and parallel to one another in a predetermined rod spacing.

Clause 3. The rod belt of clause 2, any other suitable clause, or any combination of suitable clauses, wherein each transverse rod having mounting sections with which the transverse rods rests on the belts.

Clause 4. The rod belt of clause 3, any other suitable clause, or any combination of suitable clauses, further comprising wherein the transverse rods are fastened to the belts by attachment means, passing through the mounting sections of the transverse rods and the belts.

Clause 5. The rod belt of clause 4, any other suitable clause, or any combination of suitable clauses, further comprising protective forge covers attached to the belts.

Clause 6. The rod belt of clause 5, any other suitable clause, or any combination of suitable clauses, wherein each forge cover having a mounting profile and a flexible protection profile.

Clause 7. The rod belt of clause 6, any other suitable clause, or any combination of suitable clauses, wherein the mounting profile of the forge cover is sandwiched and clamped between one of the mounting sections of the transverse rods and one of the belts, fastening the forge cover together with one of the transverse rods to the respective belt.

Clause 8. The rod belt of clause 7, any other suitable clause, or any combination of suitable clauses, wherein the protection profile of the forge cover is projecting upwards from the mounting profile of the forge cover to laterally enclose or laterally cover at least one of the mounting sections of the transverse rods by the protection profile.

Clause 9. The rod belt of claim 8, wherein the protection profile of the forge cover is designed as at least one, preferably two, flexible shoulders projecting upwards from the mounting profile of the forge cover and inclined and/or curved towards one of the mounting sections of the transverse rods.

Clause 10. The rod belt of claim 9, wherein the flexible shoulders are inclined and/or curved in such a way that, in case of being touched by agricultural crop, the flexible shoulders are folded towards the respective mounting section of the transverse rod covering it at least in part.

Clause 11. The rod belt of claim 9, wherein the mounting sections of the transverse rods are at least laterally enclosed or covered by two flexible shoulders belonging to the same forge cover attached to the respective belt or by two flexible shoulders each belonging to different forge covers attached adjacent to each other to the respective belt.

Clause 12. The rod belt of claim 9, wherein the two flexible shoulders enclose or cover at least one of the mounting sections of the transverse rods laterally, leaving an exposure above the respective mounting section in between the two flexible shoulders allowing to access the respective mounting section or the attachment means.

Clause 13. The rod belt of claim 9, wherein the two flexible shoulders are not touching each other.

Clause 14. The rod belt of claim 9, wherein the at least one, preferably two, flexible shoulders are curved over their entire length or are composed of a straight section attached to the respective mounting profile passing over into a curved section at a kink point.

Clause 15. The rod belt of claim 9, wherein the at least one, preferably two, flexible shoulders each comprise a rounded end extension.

Clause 16. The rod belt of claim 8, wherein the protection profile of the forge cover is designed as a flexible envelope, wherein a first end side of the flexible envelope is attached to the mounting profile of the forge cover and a second end side of the flexible envelope is a free end, or wherein a first end side of the flexible envelope and a second end side of the flexible envelope, both are attached to the mounting profile of the forge cover.

Clause 17. The rod belt of claim 16, wherein the flexible envelope has at least one access hole in an upper region above the respective mounting section or the attachment means.

Clause 18. The rod belt of claim 16, wherein the flexible envelope is formed as a semicircle or formed substantially or essentially semicircular between the first end side and the second end side such that the semicircular flexible envelope encloses the respective mounting section of the transverse rod laterally and also from the top.

Clause 19. The rod belt of claim 8, wherein the protection profile of the forge cover is open to the top in order to provide an access opening above the respective mounting section or the attachment means, having a certain access width, wherein the access width is chosen to be smaller than a crop width of the conveyed agricultural crop.

Clause 20. The rod belt of claim 8, wherein the mounting profile of the forge cover is sandwiched and clamped between that one of the mounting sections of the transverse rods and one of the belts that is also laterally enclosed or covered by the mounting profile of the same forge cover.

Clause 21. The rod belt of claim 8, wherein the mounting profile of the forge cover and a the flexible protection profile of the forge cover are made in one piece.

Clause 22. The rod belt of claim 8, wherein the mounting profile of the forge cover is made of a different shore hardness as compared to the flexible protection profile of the forge cover, being preferably more rigid.

Clause 23. The rod belt of claim 8, wherein a cross section of the protection profile of the forge cover is thicker than a cross section of the mounting profile of the forge cover, or vice versa.

Clause 24. The rod belt of claim 8, wherein the forge covers are completely made of a polymeric material, e.g., a thermoplastic elastomer, e.g., by extrusion, in particular multi-durometer extrusion, or by injection molding or by transfer molding or by compression molding.

Clause 25. The rod belt of claim 8, wherein the mounting sections of the transverse rods each comprises through holes mutually aligned with through holes in the belts and through holes in the mounting sections of the forge covers, wherein the attachment means passing through the through holes in the mounting section of the transverse rods, the belts and the mounting profiles of the forge covers sandwiched in between.

Clause 26. The rod belt of claim 8, wherein the mounting profile of the forge cover comprises cutouts in one or both longitudinal sides of the mounting profile, wherein the longitudinal sides are facing towards the transverse rods perpendicular to the running direction of the rod belt.

The invention claimed is:

1. A rod belt for rod belt conveyors of agricultural machines, the rod belt having a running direction and comprising:
   tensile stress-resistant, elastic and continuous belts running in parallel to one another in a running direction;
   transverse rods arranged perpendicular to the running direction and parallel to one another in a pre-determined rod spacing, each transverse rod having mounting sections with which the transverse rods rest on the belts,
   wherein the transverse rods are fastened to the belts by attachment means, passing through the mounting sections of the transverse rods and the belts; and
   protective forge covers attached to the belts, each forge cover having a mounting profile and a flexible protection profile,
   wherein the mounting profile of each forge cover is sandwiched and clamped between one of the mounting sections of the transverse rods and one of the belts in such a way that the mounting profile of the forge cover is enclosed vertically by the respective belt and the mounting section of the respective rod, fastening each forge cover together with one of the transverse rods to the respective belt, and
   wherein the protection profile of each forge cover projects upward from the mounting profile of each forge cover to laterally enclose or laterally cover at least one of the mounting sections of the transverse rods by the protection profile.

2. The rod belt of claim 1, wherein the protection profile of each forge cover is designed as at least one, preferably two, flexible shoulders projecting upwards from the mounting profile of each forge cover and inclined and/or curved towards one of the mounting sections of the transverse rods.

3. The rod belt of claim 2, wherein the flexible shoulders are inclined and/or curved in such a way that, in case of being touched by agricultural crop, the flexible shoulders are folded towards the respective mounting section of the transverse rod covering it at least in part.

4. The rod belt of claim 2, wherein the mounting sections of the transverse rods are at least laterally enclosed or covered by two flexible shoulders belonging to the same forge cover attached to the respective belt or by two flexible shoulders each belonging to different forge covers attached adjacent to each other to the respective belt.

5. The rod belt of claim 2, wherein the two flexible shoulders enclose or cover at least one of the mounting sections of the transverse rods laterally, leaving an exposure above the respective mounting section in between the two flexible shoulders allowing to access the respective mounting section or the attachment means.

6. The rod belt of claim 2, wherein the two flexible shoulders are not touching each other.

7. The rod belt of claim 2, wherein the at least one, preferably two, flexible shoulders are curved over their entire length or are composed of a straight section attached to the respective mounting profile passing over into a curved section at a kink point.

8. The rod belt of claim 2, wherein the at least one, preferably two, flexible shoulders each comprise a rounded end extension.

9. The rod belt of claim 1, wherein the protection profile of each forge cover is designed as a flexible envelope,
   wherein a first end side of the flexible envelope is attached to the mounting profile of each forge cover and a second end side of the flexible envelope is a free end, or
   wherein a first end side of the flexible envelope and a second end side of the flexible envelope, both are attached to the mounting profile of each forge cover.

10. The rod belt of claim 9, wherein the flexible envelope has at least one access hole in an upper region above the respective mounting section allowing to access the respective mounting section or the attachment means.

11. The rod belt of claim 9, wherein the flexible envelope is formed as a semicircle or formed essentially semicircular between the first end side and the second end side such that the flexible envelope encloses the respective mounting section of the transverse rod laterally and also from the top.

12. The rod belt of claim 1, wherein the protection profile of each forge cover is open to the top in order to provide an access opening above the respective mounting section or the attachment means, having a certain access width, wherein the access width is chosen to be smaller than a crop width of the conveyed agricultural crop.

13. The rod belt of claim 1, wherein the mounting profile of each forge cover is sandwiched and clamped between that one of the mounting sections of the transverse rods and one of the belts that is also laterally enclosed or covered by the mounting profile of the same forge cover.

14. The rod belt of claim 1, wherein the mounting profile of each forge cover and the flexible protection profile of each forge cover are made in one piece.

15. The rod belt of claim 1, wherein the mounting profile of each forge cover is made of a different shore hardness as compared to the flexible protection profile of each forge cover, being more rigid.

16. The rod belt of claim 1, wherein a cross section of the protection profile of each forge cover is thicker than a cross section of the mounting profile of each forge cover, or vice versa.

17. The rod belt of claim 1, wherein the forge covers are completely made of a polymeric material by extrusion, or by injection molding or by transfer molding or by compression molding.

18. The rod belt of claim 1, wherein the mounting sections of the transverse rods each comprises through holes mutually aligned with through holes in the belts and through holes in the mounting sections of the forge covers, wherein the attachment means passing through the through holes in the mounting section of the transverse rods, the belts and the mounting profiles of the forge covers sandwiched in between.

19. The rod belt of claim 1, wherein the mounting profile of each forge cover comprises cutouts in one or both longitudinal sides of the mounting profile, wherein the longitudinal sides are facing towards the transverse rods perpendicular to the running direction of the rod belt.

* * * * *